United States Patent [19]

Mosier et al.

[11] Patent Number: 4,555,625

[45] Date of Patent: Nov. 26, 1985

[54] PRECISION DRUM ENCODER

[75] Inventors: Donald E. Mosier; Michael R. Cascini, both of Cedar Rapids, Iowa

[73] Assignee: Rockwell International Corporation, El Segundo, Calif.

[21] Appl. No.: 477,202

[22] Filed: Mar. 21, 1983

[51] Int. Cl.[4] .............................................. G01D 5/34
[52] U.S. Cl. ......................... 250/231 SE; 250/237 G; 340/347 P
[58] Field of Search ..... 250/231 SE, 237 G, 231 GY; 340/347 P; 356/395, 398

[56] References Cited

U.S. PATENT DOCUMENTS

| | | | |
|---|---|---|---|
| 3,808,431 | 4/1974 | Hedrick | 340/347 P |
| 4,025,914 | 5/1977 | Akita | 340/347 P |
| 4,201,911 | 5/1980 | Dering | 250/231 SE |
| 4,240,066 | 12/1980 | Lenox | 340/347 P |
| 4,384,204 | 5/1983 | Tamaki et al. | 250/231 SE |

Primary Examiner—David C. Nelms
Assistant Examiner—James Gatto
Attorney, Agent, or Firm—Robert C. Mayes; George A. Montanye; H. Fredrick Hamann

[57] ABSTRACT

Disclosed is a highly precise encoding structure utilizing incremental or absolute encoding techniques. The drum configuration allows the use of less expensive materials and the capability to manufacture such a device in a labor-saving and therefore less expensive manner. This is accomplished, in part, by utilizing drums having differing radius measurements, thereby requiring a simpler gearing interrelationship between the plurality of drums. Furthermore, in one embodiment, drums of differing sizes may be installed one inside the other in a space-saving configuration.

11 Claims, 5 Drawing Figures

PRECISION DRUM ENCODER

BACKGROUND OF THE INVENTION

This invention relates to electronics in general and to precision position encoders in particular.

The requirement for precisely locating the position of rotatable shafts or parts of moving machinery such as servos and input controls has resulted in the development of various types of position encoders. These are normally capable of being positioned on a shaft such that movement of the shaft relative to the housing fixture results in a signal which is detected and interpreted either as in increment change coupled with an adder or as an absolute function of the position.

Flat disk-shaped encoders having a coded surface have been used; however, one problem noted in using these disk-shaped encoders has been the relative angular precision required for both installation of the sensors and the coding requirement on the disk itself.

Linear encoders such as a resistive element with a movable contact thereon will not normally have angular difficulties associated with their construction; however the types and amounts of information available from such an encoder will be limited.

SUMMARY AND BRIEF DESCRIPTION OF THE INVENTION.

Accordingly, it is an object of the present invention to provide a position encoder capable of being manufactured and installed in an efficient and cost-saving manner.

Another object of the present invention is to provide a position encoder having the capability of providing an increased amount of information while occupying a relatively small volume.

Briefly, and in accordance with the present invention, a position encoder comprises a light source attached to a first member, a light sensor attached to a second member and capable of operation in cooperation with the light source, and a drum-shaped mask disposed interjacent said light sensor and said light source, rigidly attached to a third member wherein said third member is capable of rotational movement relative to said first and second members. The third member is normally a shaft which may be directly coupled to a rotating motor or control input knob, or may be geared in a wide variety of ways known in the art to turn the drum-shaped mask in between the light source and sensor and thus relate rotational position directly into an encoded electrical signal.

The position encoder may be an incremental encoder having evenly spaced openings on the drum such that as the shaft turns, the signal output from the light sensor is processed by an adder and the actual position is the sum of the signals output.

Alternatively, the mask may be encoded as an absolute position encoder wherein at any time the light sensors will output a combination of signals resulting from a series of openings on the drum such that the absolute position of the drum may be determined at any time without the requirement for adder circuitry. Additionally, combinations of incremental and absolute position encoders may be utilized in cooperation.

A plurality of light sensors rigidly attached to a frame member, in one embodiment, cooperate with a plurality of light sources matching the light sensors which are additionally rigidly attached to the frame member, and a plurality of drum-shaped masks disposed interjacent the light sources and the light sensors, rigidly attached to an arm, the arm rotationally movable relative to the frame member, wherein the mask interrupts the cooperation between the light sources and the light sensors as a function of rotational movement of the arm relative to the frame member.

In most embodiments in accordance with the present invention, the rotational axis of the drum will be in a parallel configuration with the rotational axis of a second drum in an encoder requiring two or more drum masks. The masks will normally be related in their rotational movement by a gearing structure providing a predetermined rotation for the first drum relative to the second for a specified number of turns of the input shaft.

The relationship of two or more drums may be in an end-to-end relationship having an essentially coincident rotational axis, or a parallel relationship where the drums are essentially in parallel within the encoding structure. The present invention can also effectively be utilized by having a smaller drum inserted inside a larger drum mask, and in all multiple mask configurations, closely controlling the gearing relationship between the drums.

The novel features believed to be characteristic of this invention are set forth in the appended claims. The invention itself, however, as well as other objects and advantages thereof, may best be understood by reference to the following detailed description of illustrative embodiments when read in conjunction with the accompanying drawings in which:

DETAILED DESCRIPTION OF THE DRAWINGS

Figure 1:
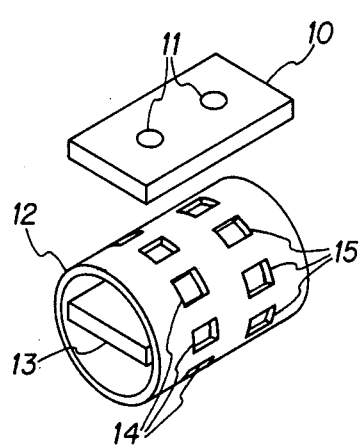
FIG. 1 is a high resolution digital position encoder in accordance with the present invention, capable of incrementally encoding rotational movement.

Referring now to FIG. 1, an incremental encoder having a drumshape is shown wherein the light sensors 11 are mounted on a circuit board 10 held fixed relative to circuit board 13 which has cooperating light emitters mounted thereon. Drum 12 is attached to a rotational arm (not shown) and thereafter the mask holes 14 and 15 will allow light to be transmitted from board 13 to board 10 when the holes line up with respect to light emitters and light sensors. As is known in the art, incremental encoders require somewhat more complex circuitry to maintain an accurate count of the mask openings moving through the sensor zone as well as a rotational direction indicator.

Figure 2:
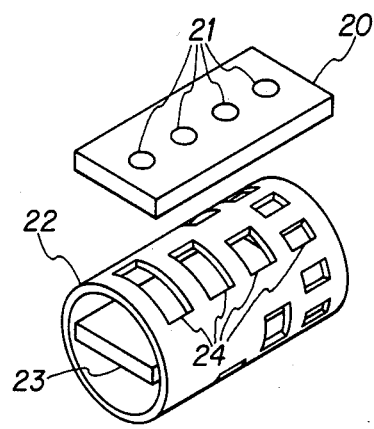
FIG. 2 is an alternative embodiment capable of encoding absolute rotational position.

Referring now to FIG. 2, an alternative embodiment of the present invention is shown as an absolute position encoder wherein drum 22 has slots 24 in the drum surface configured such that light being emitted from the light emitters on board 23 inside the drum shines through to the light sensors 21 mounted on board 20 only upon the proper rotational position of drum 22 relative to boards 23 and 20. Again, by proper sensing of the light emitted and allowed to pass through drum 22, the absolute position of the drum may be determined and by a direct corollary, the absolute position of any rotational arm or shaft to which drum 22 is attached.

Figure 3:
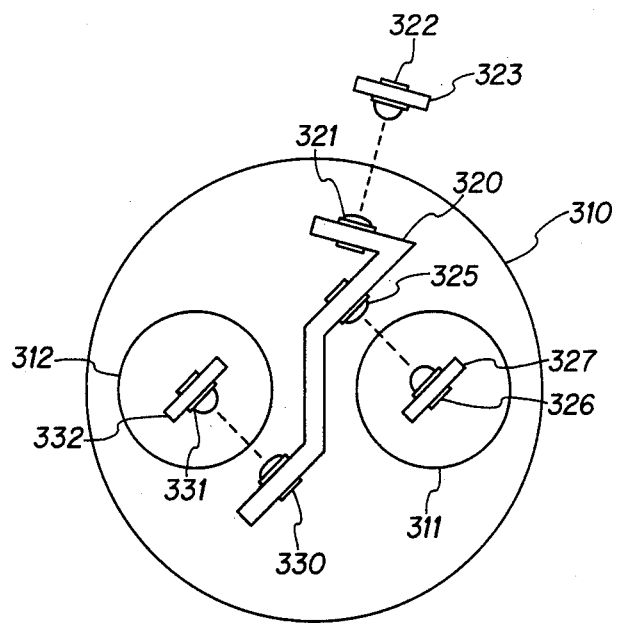
FIG. 3 is an alternative embodiment of the present invention having two smaller drums in parallel inserted into a larger single drum mask unit.

Referring now to FIG. 3, an end view of three cooperating drum encoders is shown wherein drum 312 and drum 311 are parallel and are wholly contained within drum 310. Light emitter 332 cooperates with light sensor 330 to provide an encoded output from sensor 330 relative to the motion of drum encoder 312. Similarly, drum 311 masks the light emitted by light source 326 transmitted to light sensor 325 mounted on board 320. Drum 310 masks the light emitted by source 322 to the sensor 321 and completely surrounds the remaining portions of the apparatus with the exception of the light source 322 and its mounting board 323. In this configuration, and with appropriate gearing as is known in the art, it is simpler to manufacture the shown device than a disk encoder. This is due to the linear arrangement of the sensors and light emitters (as is more clearly shown in FIG. 4), and the increased ease of encoding a drum as a flat rectangular part. The encoded part is then formed into the drum shape by rolling or bending it around a cylindrical form and attaching the ends together.

In the embodiment shown in FIG. 3, it can be seen that the light sensors are all mounted on board 320 for each of the three drums. Light boards 327, 323, and 332 are each mounted independently and aligned with its respective sensor set in such a way that the respective drum is able to move between the sensor and the light source without touching any other mechanism.

Figure 4:
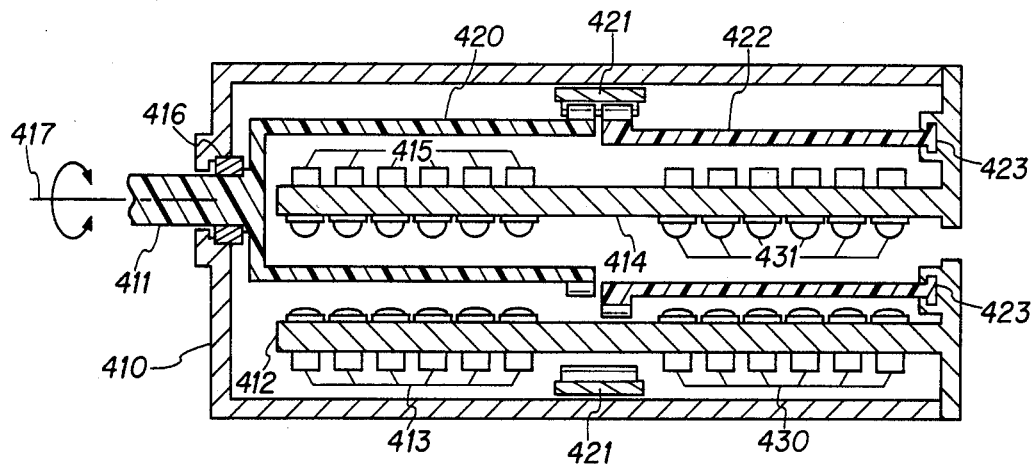
FIGS. 4 and 4a are an alternative embodiment of the present invention having two drums of different circumference geared together in an end-to-end configuration and shown in cross-section.

Referring now to FIG. 4, a cross-sectional view of a two drum structure is shown wherein the rotational input shaft 411 drives the first drum 420 at a rate equivalent to that of the rotational input around axis 417. Ring gear 421 transmits rotational motion from drum 420 to drum 422 which is suspended in bearings 423. A light source support member 414 is fixed relative to the frame member 410 and provides support for a plurality of light sources 415 for transmission to light sensors 413 mounted on support member 412, also mounted rigidly on frame member 410. Likewise, drum 422 utilizes light sources 431 to transmit to light sensor 430 and in this configuration the input shaft member 411, supported by bearing 416, is capable of rotational movement on the order of tens of turns or more, dependent upon the gearing ratio between the teeth on drum 420 relative to the teeth on drum 422, without duplicating sensor output signals. Beginning at an initialized position, rotating shaft 411 in 360° in either direction will leave drum 420 in its initialized starting position. Drum 422, however, will not be returned completely to the initialized position. Therefore, the drum 420 is used to relate the angular deviation from a first initialized position within a single rotation, and drum 422 is for relating which rotation and in which direction of rotation the shaft 411 is turned.

Figure 4A:
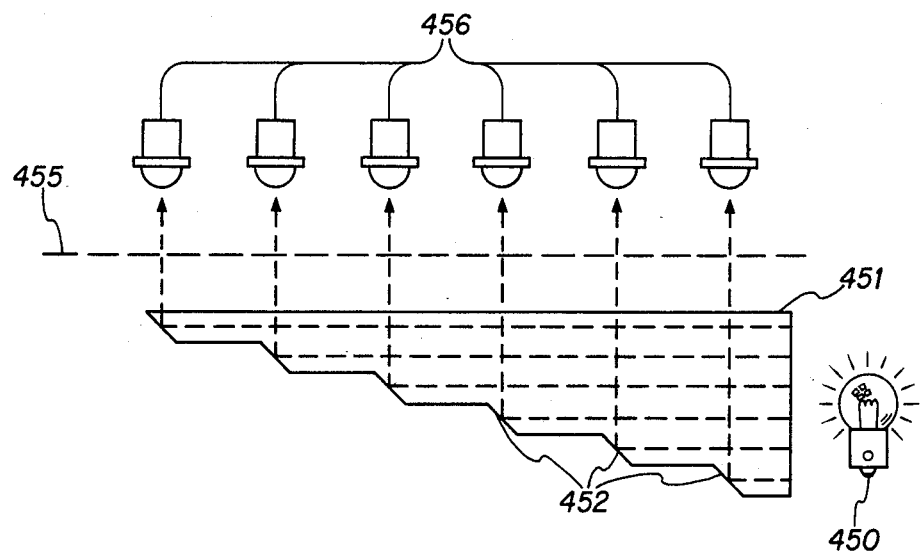

An alternative light source is shown in FIG. 4a which is capable of illuminating light sensors 456 as mounted in a drum encoder assembly such as shown in FIG. 4 wherein the drum encoder interrupts light passage by physically occupying the space shown by section line 455 and the light source is provided by a single incandescent bulb 450 illuminating a light transmissive medium 451 such as a fiber optic channel having reflective faces 452 mounted in the appropriate positions for deflecting light from bulb 450 into each of the respective sensors 456.

It should be noted that in FIG. 3 and in FIG. 4 all light sensors are mounted on a single sensor mounting board (320 for FIG. 3, and 412 for FIG. 4). This facilitates connection to the position interpreting circuitry (not shown). It should also be noted that the use of aperture plates, although not shown in the drawings herein, is known in the art and can be readily applied to the present invention to facilitate construction and operation of the various embodiments, and to improve the repeatability of the light sensing function.

While this invention has been described with reference to various illustrative embodiments, it is not intended that this description be construed in a limiting sense. Various modifications of the illustrative embodiments as well as other embodiments of the invention, will be apparent to persons skilled in the art upon reference to this description. It is therefore contemplated that the appended claims will cover any such modifications of embodiments as fall within the true scope of the invention.

What is claimed is:

1. A position encoder comprising in combination:
   a. a plurality of light sensors rigidly attached to a frame member;
   b. a plurality of light sources matching said light sensors and in cooperation therewith, and rigidly attached to said frame member; and
   c. a plurality of drum-shaped masks, at least one of said plurality of masks having a smaller circumference than another one of said plurality of masks, and said masks are disposed interjacent said light sources and said light sensors, masks are rigidly attached to an arm, said arm rotationally moveable relative to said frame member, wherein said masks interrupt said cooperation between said light sources and said light sensors as a function of rotational movement of said arm wherein at least two of said drum-shaped masks are positioned relative to each other having a first mask at least partially inside the second mask.

2. A position encoder as in claim 1 wherein said plurality of drum-shaped masks are each rotationally moveable about a rotation axis and the axes of rotation of each of said plurality of drum-shaped masks are parallel.

3. A position encoder as in claim 1 wherein said axes of rotational movement are coincident.

4. A position encoder as in claim 1 wherein at least two of said plurality of drum-shaped masks are positioned relative to each other in an end-to-end configuration.

5. A position encoder as in claim 2 wherein at least two of said drum-shaped masks are positioned relative to each other in a side-by-side parallel configuration.

6. A position encoder having a plurality of light sources, each source coupled to a respective light sensor, and having at least two cylindrical masks having different radius measurements, one from the other, and disposed interjacent said light sources and said light sensors such that a first cylindrical mask relates rotational movement to a single rotational movement shaft, and said second cylindrical mask is related to said first in a geared relationship wherein said at least two cylindrical masks are positioned relative to each other having a first mask at least partially inside the second mask.

7. A position encoder as in claim 6 wherein said first and second cylindrical masks are positioned relative to each other in an end-to-end configuration.

8. A position encoder as in claim 10 wherein said at least two cylindrical masks are positioned relative to each other in a side-by-side parallel configuration.

9. A position encoder as in claim 6 wherein all of said light sensors are constructed upon a single sensor member.

10. A position encoder as in claim 6 wherein said geared relationship further comprises an idler gear.

11. A position encoder as in claim 10 wherein said idler gear further comprises a ring gear.

* * * * *